(12) United States Patent
McCarty

(10) Patent No.: US 6,807,801 B2
(45) Date of Patent: Oct. 26, 2004

(54) RAPID SHUTDOWN AND ECOLOGY SYSTEM

(75) Inventor: Robert S. McCarty, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 219 days.

(21) Appl. No.: 10/428,285

(22) Filed: May 1, 2003

(65) Prior Publication Data

US 2004/0025511 A1 Feb. 12, 2004

Related U.S. Application Data

(62) Division of application No. 09/877,643, filed on Jun. 8, 2001, now abandoned.

(51) Int. Cl.[7] .............................. F02C 7/232; F02C 9/28
(52) U.S. Cl. ................................. 60/39.094; 60/39.281
(58) Field of Search .......................... 60/39.094, 39.281, 60/773

(56) References Cited

U.S. PATENT DOCUMENTS

| | | | |
|---|---|---|---|
| 2,846,845 A | 8/1958 | Parker | |
| 2,881,827 A | 4/1959 | Roche et al. | |
| 3,103,229 A | 9/1963 | Smith | |
| 3,344,602 A | 10/1967 | Davies et al. | |
| 3,358,455 A | 12/1967 | Hunt | |
| 3,498,056 A | 3/1970 | Avery | |
| 4,041,695 A | 8/1977 | Harper et al. | |
| 4,206,595 A | 6/1980 | Cole | |
| 4,719,749 A | 1/1988 | Greune et al. | |
| 4,984,424 A | 1/1991 | Shekleton | |
| 5,095,694 A | 3/1992 | Shekleton et al. | |
| 5,528,897 A | 6/1996 | Halin | |
| 5,735,117 A | 4/1998 | Toelle | |
| 5,809,771 A | 9/1998 | Wernberg | |
| 6,195,978 B1 * | 3/2001 | Futa | 60/39.094 |
| 6,314,998 B1 * | 11/2001 | Futa et al. | 60/39.094 |

* cited by examiner

Primary Examiner—Louis J. Casaregola
(74) Attorney, Agent, or Firm—Robert Desmond, Esq.

(57) ABSTRACT

A dual function rapid shutdown and ecology system for fuel delivery systems for engines, specially aircraft gas turbine engines, is disclosed. The dual function is accomplished in a single module operated by a single electro-magnetic solenoid valve commanded by the engine electronic control unit. Upon actuation of the solenoid valve, a large spring loaded piston strokes to the extreme of its travel creating a cavity having a volume sufficient to accommodate all fuel leftover in the fuel manifold and distribution system at shutdown, thus preventing atmospheric pollution or engine damage upon subsequent operation. Simultaneous with actuation of the solenoid valve, fuel pressure differentials cause a small piston to stroke to the extreme of its travel opening fuel passageways and causing all the fuel being delivered to the engine combustion chamber to be bypassed back to pump inlet, thus effectively accomplishing the rapid shutdown function. An alternate embodiment allows for use of the dual function system on engines employing low pressure differentials along the various stages of the fuel control system manifold or where the ecology function is not required.

19 Claims, 4 Drawing Sheets

RAPID SHUTDOWN AND ECOLOGY SYSTEM

CROSS REFERENCE TO RELATED APPLICATION

The present application is a divisional of application Ser. No. 09/877,643, filed Jun. 8, 2001 (abandoned).

BACKGROUND OF THE INVENTION

The present invention relates generally to fuel delivery systems for engines, especially aircraft gas turbine engines, and, more particularly, to a dual function rapid shutdown and ecology system for such fuel delivery systems, which performs its function upon engine shutdown.

Two of the functions provided by the fuel control system of a gas turbine engine are fuel shutoff/turn-on and ecology fuel management. The first function, fuel shutoff/turn-on, may be manually commanded from the control system (for instance, by the pilot for aircraft applications), or it may be triggered automatically through an overspeed detection system provided by the engine's electronic control. In the later case, the response of the system must be extremely fast so as to limit the engine speed excursions above the normal operating range.

A second function of the fuel control system is ecology management, and requires that the fuel in the manifold be disposed of properly during shutdown and not be allowed to drain into the engine where it will vaporize and/or smoke when in contact with the still-hot combustion chamber, thereby creating atmospheric pollution. Also, after any type of shutdown, it is necessary that fuel remaining in the engine fuel manifold be removed rapidly to keep it from puddling. Fuel left in the manifold can cause hot starts upon subsequent engine operation and will also coke the engine's fuel nozzles, a condition which hinders nozzle performance, leading to premature failure.

An examination of prior art shows that there have been many and varied attempts to address one or both of the aforementioned fuel control system functions. Of particular interest in this regard are the following references and examples:

U.S. Pat. No. 4,206,595 discloses a system to collect fuel left over in the fuel manifold upon engine shutdown and reintroduce it on the next engine start. The system uses two check valves, two springs and two pistons to accomplish this function.

U.S. Pat. No. 5,809,771 teaches a system which uses flow divider differential pressure to remove fuel from the fuel manifold upon engine shut-down and which temporarily stores the fuel until the engine is subsequently restarted.

U.S. Pat. No. 6,195,978 B1, assigned to the assignee of this application, involves a system whereby fuel flow is reversed upon engine shut-off by adding one valve to the main fuel control and modifying the main fuel control pressurizing valve to include a pressure switch function. The invention is also directed toward gas turbine engines that include both primary and secondary manifold systems.

U.S. patent application Ser. No. 09/361,932, also assigned to the assignee of this application, discloses a fuel divider and ecology system adapted for engines requiring three discrete fuel manifolds. The ecology function is accomplished using one single chamber staged valve and modifying the main fuel control pressurizing valve to include a pressure switching function.

Various other prior art fuel systems have addressed fuel shutoff/turn-on concerns as well as ecology issues and have introduced various other techniques in an effort to control both problems. Examples include: draining fuel overboard after engine shutdown, blowing unburned fuel into and through the engine at shutdown, and draining unburned fuel into a tank that must be manually emptied.

None of the above cited prior art provide a single, simple, module that accomplishes the dual functions of rapid shutoff (or turn on) of fuel flow as well as ecology management.

SUMMARY OF THE INVENTION

The present invention accomplishes the dual function of rapid shutdown and ecology management in a single module operated by a single electromagnetic solenoid valve. In one aspect of the present invention, a cylindrically shaped valve body is provided to house a large spring loaded piston member, which when extended due to pressure differentials caused by actuation of the solenoid valve, provides sufficient volume to accommodate all fuel left over in the fuel manifold and distribution system at shutdown. Simultaneously, a secondary small piston member, which is housed internal to the underside of the large piston member, also actuates causing all fuel being delivered to the engine combustion chamber to be bypassed back to pump inlet.

In another aspect of the present invention, separate cylindrically shaped valve bodies are provided to house the large spring loaded piston member and the small piston member. This alternate embodiment is intended for use on fuel control systems employing low pressure differentials along various stages of the fuel control system manifold. The large spring loaded piston member extends at low pressure differentials caused by actuation of the solenoid valve, and provides sufficient volume to accommodate all fuel left over in the fuel manifold and distribution system at shutdown. A small accumulator, or alternatively a check valve, is provided to accommodate a small amount of fuel displaced upon actuation of the large piston member. Simultaneously, with actuation of the solenoid valve, the remotely located small piston member, also actuates causing all fuel being delivered to the engine combustion chamber to be bypassed back to pump inlet.

These and other objects, features and advantages of the present invention, are specifically set forth in, or will become apparent from, the following detailed description of embodiments of the invention when read in conjunction with the accompanying drawings.

DETAILED DESCRIPTION OF THE INVENTION

The following detailed description is for the best currently contemplated methods for carrying out the invention. The description is not to be taken in a limiting sense, but is made merely for the purpose of illustrating the general principles of the invention.

In order to fully appreciate this invention, it is best to describe the details of the component parts in connection with the operational modes of the gas turbine engine's fuel control system. In this light the descriptions that follow address both engine operation and shutdown modes for two embodiments of the inventive rapid shutdown and ecology system.

Figure 1:
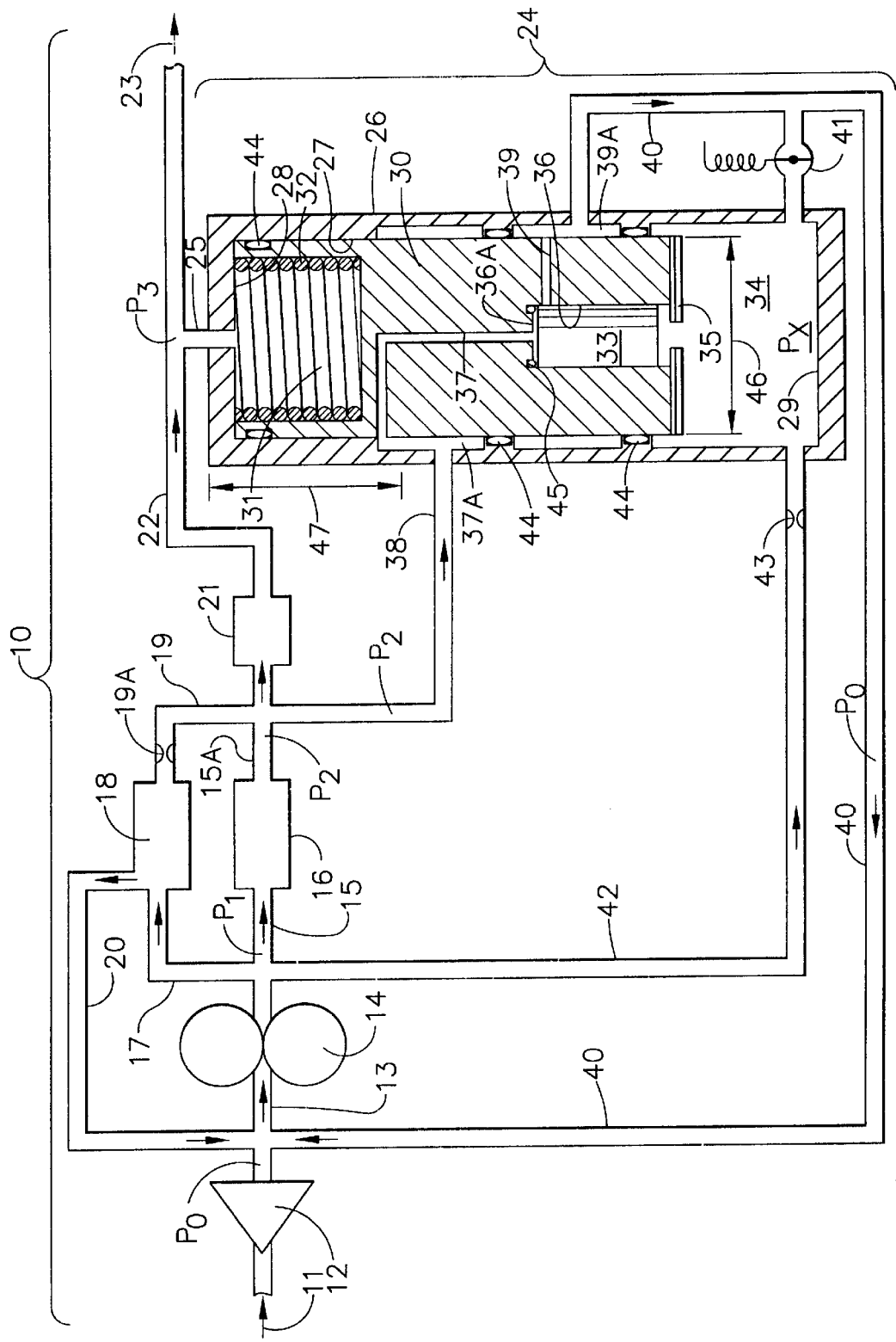
FIG. 1 is a schematic and partial cross sectional representation of a gas turbine engine fuel control system, including an embodiment of the inventive rapid shutdown and ecology system, shown in its first position during engine operation.

In FIG. 1, an illustrative gas turbine engine fuel control system 10 of a mostly conventional configuration known to those skilled in the art includes fuel supply 11 originating from fuel tanks (not shown) entering a low pressure fuel pump 12, which increases the pressure in line 13 to level Po. Fuel then proceeds to high pressure pump 14, which further increases fuel pressure to level P1 in line 15, at which point it enters metering valve 16 for modulating the rate of flow from the fuel supply to the combustor atomizers (not shown). Fuel pressure in line 15A downstream of metering valve 16 decreases to level P2 (by the setting of bypass valve 18) and thereafter further decreases to level P3 in line 22 after passing through pressurizing valve 21, which controls and establishes a minimum pressure of fuel delivered to the combustor atomizers downstream of flow arrow 23. The bypass valve 18 returns, via lines 19 and 20, pump flow in excess of metered flow and also controls fuel pressure such that P1 is always higher than P3, usually about 25 psi or greater. Additionally, at low fuel flow rates, P1 will be additionally higher than P3 by the setting of pressure rising valve 21. Orifice 19A is provided on line 19 to create a damping pressure drop to stabilize bypass valve 18. All functions of the gas turbine engine fuel control system 10 are commanded by the engine electronic control unit (ECU), which is not shown on the drawings, by repositioning the metering valve 16.

The inventive rapid shutdown and ecology system 24 communicates with line 22 by means of line 25, and is positioned to be downstream of pressure rising valve 21 and upstream of the combustor atomizers. It is comprised of a metallic cylindrically shaped valve body 26 internally bored to define valve chamber 27 having an upper end 28 and an a lower end 29 at the longitudinal extremities. A large piston member "B" 30 is movable along the longitudinal axis of the valve chamber 27 between upper end 28 and lower end 29. The flat surface of large piston member "B" 30 at the upper end 28 is bored to form fuel cavity "B" 31. The depth and diameter of said fuel cavity "B" 31 are sized to provide a scavenge volume sufficient to accommodate all fuel in the fuel control system 10 downstream of pressure rising valve 21, when the large piston member "B" 30 has moved to the extreme of its stroke in the direction of lower end 29. A spirally wound spring 32 is positioned along the axial periphery of fuel cavity "B" 31, such that when compressed, one end bears on upper end 28 and the other end bears on the base of fuel cavity "B" 31. Spring 32 is designed to remain fully compressed when fuel pressure Px in fuel cavity "A" 34 is sufficiently greater than P3, the pressure immediately downstream of pressure rising valve 21. In other words, the difference between Px and P3 times the area of piston B must be greater than the load in spring 32. O-ring seals 44 are provided at three circumferential levels to prevent fuel flow between the inner surface of valve chamber 27 and the exterior surface of large piston member "B" 30 when the latter strokes along the longitudinal axis of valve chamber 27.

Small piston member "A" 33 is placed internal to a close tolerance cylindrically bored cavity 36 located along the longitudinal centerline of large piston member "B" 30 at lower end 29. Small piston member "A" 33 may be equipped with an o-ring seat 45 to prevent any leakage of metered fuel during normal engine operation. Face plate 35, secured to large piston member "B" 30, interlocks small piston member "A" 33 within bored cavity 36. Two fuel passages extending from bored cavity upper end 36A provide communication with elements of the fuel control system 10 manifold as follows: Passageway 37 leads to annular cavity 37A on valve body 26, and then to line 38, thus permitting free flow of fuel from downstream of metering valve 16 to small piston member "A" 33 at the bored cavity upper end 36A. Fuel passageway 39 leads to annular cavity 39A on valve body 26, and then via line 40 to line 13 downstream of the low pressure fuel pump 12. Electro-magnetic solenoid valve 41, which is commanded by the ECU, connects line 40 with fuel cavity "A" at lower end 29. On the opposite side of valve body 26, line 42 connects fuel cavity "A" 34 with line 15, immediately downstream of high pressure pump 14. A small orifice 43 is provided on line 42 to establish a pressure drop from P1 to Px when solenoid valve 41 is open. For one embodiment, diameter 46 of large piston member "B" 30 is about 2.5 inches and stroke 47 is about 1.5 inches. Those dimensions will vary as a function of the specific gas turbine engine's fuel control system configuration.

Still referring to FIG. 1, the fuel control system is shown in its first position during engine operation. Solenoid valve 41 is closed and pressure in fuel cavity "A" 34, Px, is equal to P1, which is always higher than P3 (by at least about 25 psi). Accordingly, large piston member "B" 30 is fully stroked toward upper end 28, and spring 32 is fully compressed. Simultaneously, since Px is higher than P2, small piston member "A" 33 is fully stroked toward bored cavity upper end 36A, thus preventing fuel flow from line 38 to line 40. Therefore, during engine operation, the inventive rapid shutdown and ecology system remains inoperative.

Figure 2:
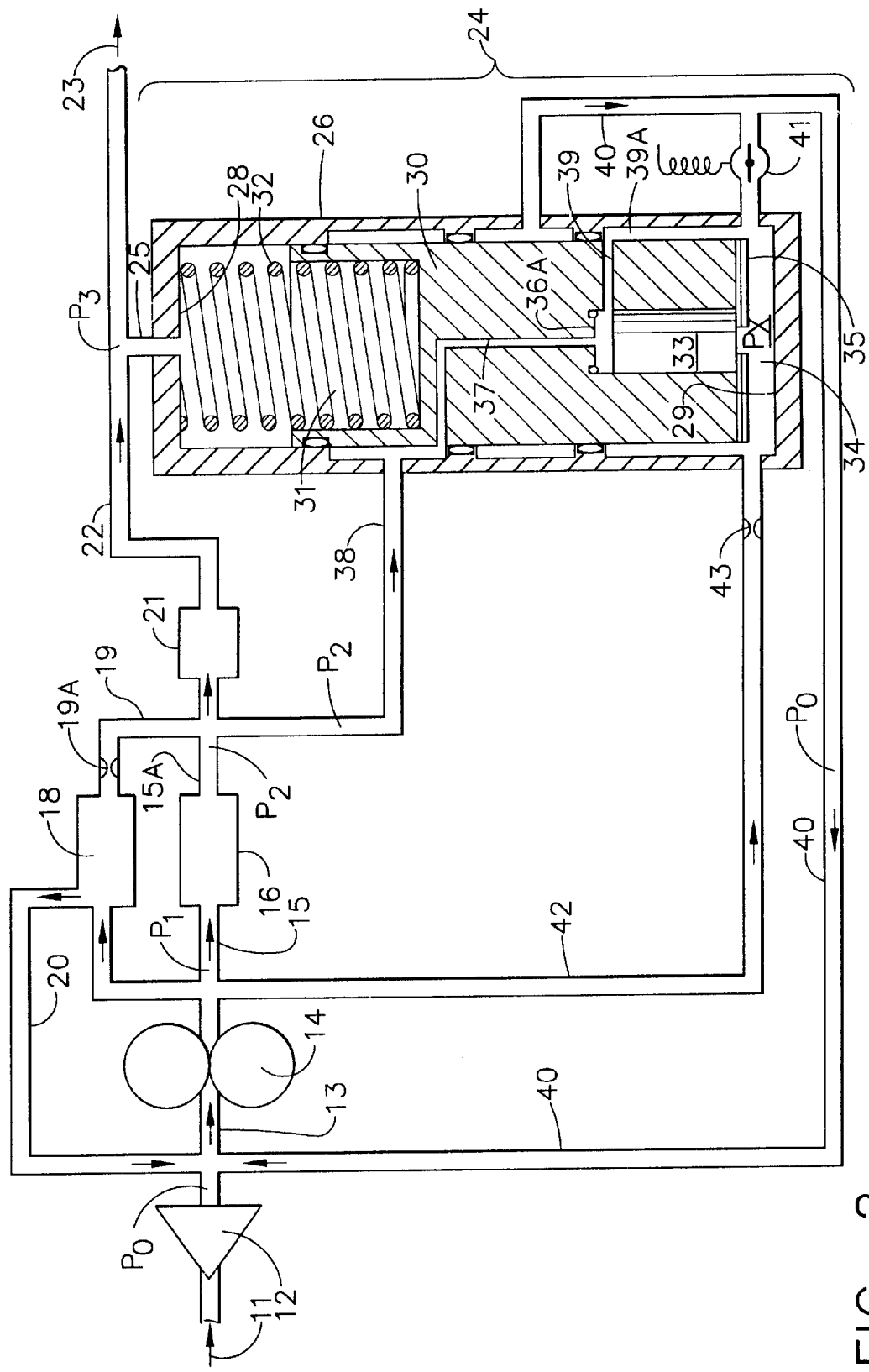
FIG. 2 is a similar schematic and partial cross sectional representation of a gas turbine engine fuel control system, including an embodiment of the inventive rapid shutdown and ecology system, shown in its second position at engine shut down.

Referring now to FIG. 2, there is shown the same gas turbine engine fuel control system schematic as in FIG. 1 with the exception that the embodiment of the inventive rapid shutdown and ecology system 10 is now shown in its second position at engine shut down. It is at this phase that it accomplishes its intended dual function of rapid shutoff (or turn on) of fuel flow as well as ecology fuel management.

When the gas turbine engine is shut down either by manual command from the control system (for instance, by the pilot for aircraft applications) or automatically through an overspeed, overtemperature or other fault detection system, the ECU opens solenoid valve 41 and shortly thereafter, when P2 falls below a predetermined level, pressure rising valve 21 closes. Closure of pressure rising valve 21 terminates fuel delivery to the combustor atomizers and opening of solenoid valve 41 immediately establishes a communication path between the upstream and downstream sides of high pressure pump 14 (via line 42, fuel cavity "A" 34, solenoid valve 41, and line 40). Due to the pressure drop of orifice 43, fuel pressure in fuel cavity "A" 34, Px, thus drops to Po, causing spring 32 to shift large piston member "B" 30 to the extreme of its stroke in the direction of lower end 29. This action increases the volume of fuel cavity "B" 31 thereby collecting all the fuel in the fuel control system 10 downstream of pressure rising valve 21, and preventing it from draining into the engine creating atmospheric pollution and/or puddling, causing hot starts upon subsequent engine operation.

Simultaneously with the reduction of Px to Po, small piston member "A" 33 moves toward lower end 29, thus establishing an open communication path between passageways 37 and 39, annular cavity 39A, and line 40. In addition, as the pressure in lines 37, 38 and 19 fall to the Po level the bypass valve 18 moves toward orifice 19A. These actions cause all of the fuel being delivered to the chamber atomizers to be immediately bypassed back to the high pressure pump 14 inlet, either through the bypass valve itself or through piston "A" cavity upper end 36A. The rapid shutoff of fuel flow to the engine has therefore been achieved.

When solenoid valve 41 is again closed by ECU command, the reverse process takes place. Fuel cavity "A" pressure Px increases to P1 forcing small piston member "A" 33 to move toward bored cavity upper end 36A, closing passageway 39 and terminating the fuel bypass condition. Large piston "B" 30 also moves toward upper end 28, compressing spring 32, and forcing the fuel previously collected in fuel cavity "B" 31 to return to the fuel control system manifold downstream of pressure rising valve 21. Rapid turn on of fuel flow to the engine has therefore been achieved and atmospheric pollution has been prevented.

On some gas turbine engine fuel control systems, the setting of bypass valve 18 is quite low and pressure rising valve 21 is referenced to Po rather than P2. Under those conditions, the difference between P1 and P3 is insufficient to compress spring 32 and hold large piston member "B" 30 fully stroked toward upper end 28, as shown in FIG. 1. To accommodate those conditions and still provide the intended dual function of rapid shut down (or turn on) of fuel flow as well as ecology fuel management, another embodiment of the inventive rapid shut down and ecology system has been devised and is shown on FIGS. 3 and 4.

Figure 3:
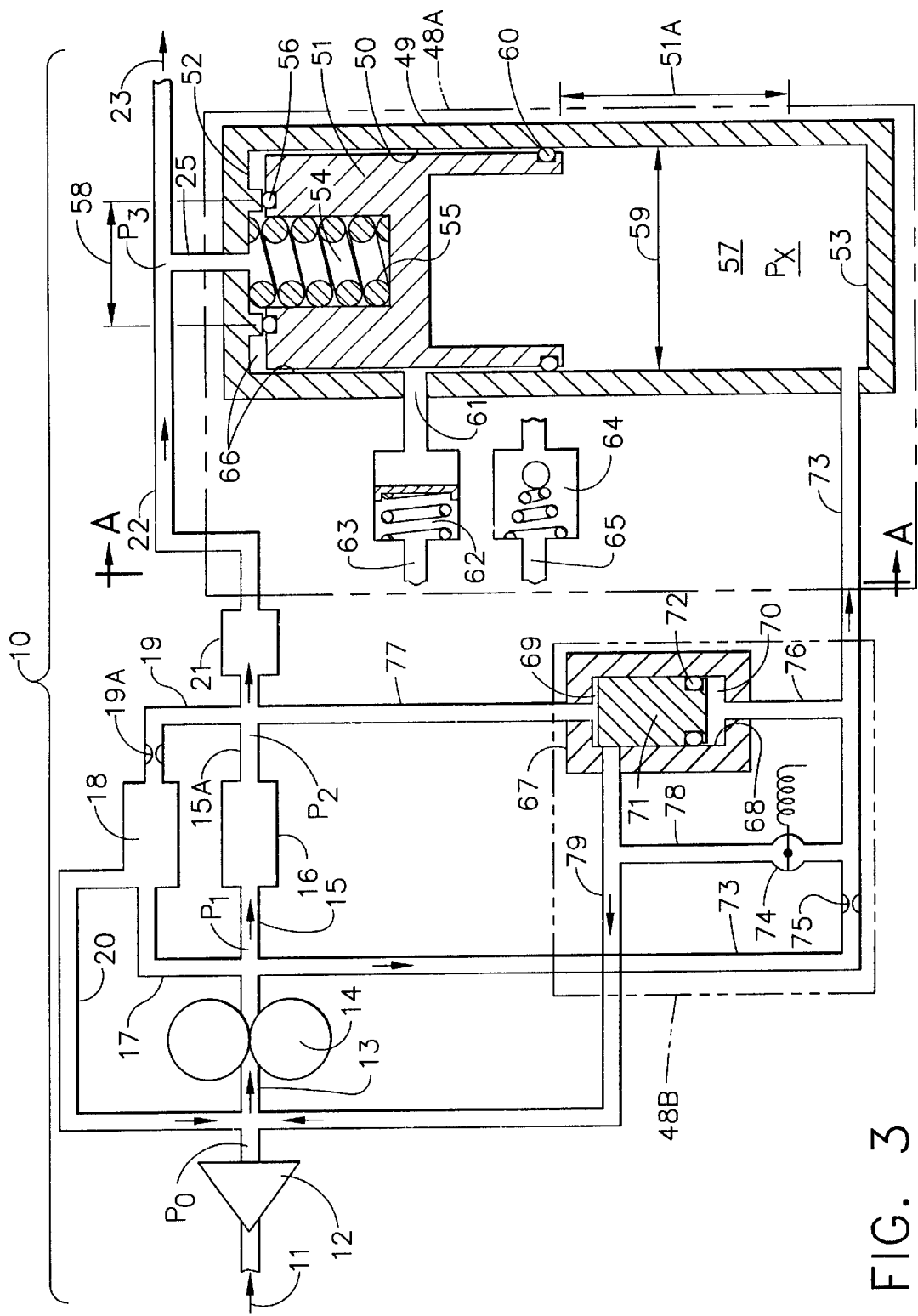
FIG. 3 is a schematic and partial cross sectional representation of a gas turbine engine fuel control system, including an alternate embodiment of the inventive rapid shutdown and ecology system, shown in its first position during engine operation.

In FIG. 3, another embodiment of the inventive rapid shutdown and ecology system is shown in its first position during engine operation. The gas turbine engine fuel control system 10 is the same as that shown of FIGS. 1 and 2, and is comprised of the same conventional components, including low pressure fuel pump 12, high pressure pump 14, metering valve 16, bypass valve 18, pressurizing valve 21, and various inter-communicating fuel lines, and all functions are commanded by the engine electronic control unit (ECU).

The other embodiment is comprised of two separately functioning subsystems, one for the ecology management function 48A and another for the rapid shutdown function 48B. The ecology management subsystem is shown to the right of view line A—A, and may be remotely located from the remaining fuel control system. It is comprised of a cylindrically shaped valve body 49 internally bored to define valve chamber 50 having an upper end 52 and an lower end 53 at the longitudinal extremities. A large piston member "B" 51 is movable along the longitudinal axis of valve chamber 50 between upper end 52 and lower end 53. The flat surface of large piston member "B" 51 at the upper end 52 is bored to form fuel cavity "B" 54. The depth and diameter of said fuel cavity "B" 54 are sized to provide a scavenge volume sufficient to accommodate all fuel in the fuel control system 10 downstream of pressure rising valve 21, when the large piston member "B" 51 has moved to the extreme of its stroke in the direction of lower end 53. A spirally wound spring 55 is positioned along the axial periphery of fuel cavity "B" 54, such that when compressed, one end bears on upper end 52 and the other end bears on the base of fuel cavity "B" 54. Spring 55 is designed to remain fully compressed when fuel pressure Px, in fuel cavity "A" 57, acting on piston diameter "A" 59 produces a force which is greater that the force produced by pressure P3 acting on the smaller piston diameter "B" 58.

When large piston member "B" 51 is in contact with upper end 52 during engine operation, fuel leakage from P3 to Px is prevented by circumferential o-ring seal 56 and annular o-ring seal 60. Under this condition, the small amount of fuel displaced into large piston annular cavity 66 is routed via fuel port 61 into a small, spring loaded, accumulator valve 62 where it is temporarily stored until engine shut down, at which time the spring load forces its return to fuel cavity "B" 54. A "witness" drain 63 is provided to collect any inadvertent fuel leakage past accumulator valve 62. An alternate embodiment involves use of a spring loaded check valve 64 in lieu of accumulator valve 62. In such a case, the displaced fuel is released via line 65 to any fuel line, such as line 40, having pressure Po.

For another embodiment of the ecology management subsystem 48A, piston diameter "A" 59 is about 2.5 inches and piston diameter "B" 58 is about 2.0 inches, while stroke 51A is about 1.5 inches. Those dimensions will vary as a function of the specific gas turbine engine's fuel control system configuration.

Still referring to FIG. 3, the rapid shutdown subsystem 48B is comprised of a metallic cylindrically shaped valve body 67 internally bored to define valve chamber 68 and having an upper end 69 and a lower end 70. A closely fitting cylindrically shaped small piston 71 placed internal to valve body 67 and is movable along the longitudinal axis of valve chamber 68 between the upper end 69 and the lower end 70. An o-ring seal 72 is fitted along the periphery of small piston 70 to prevent fuel passage between upper 69 and lower 70 ends of valve chamber 68.

The rapid shutdown subsystem 48B communicates with the ecology subsystem 48A and other elements of the fuel control system 10 by means of the following fuel lines: Line 73 is connected to line 15 downstream of high pressure pump 14 and leads to solenoid valve 74 (which is commanded by the ECU) and then to fuel cavity "A" 57 of the ecology subsystem 48A. An orifice 75 is provided to create a pressure drop from P1 to PX when the solenoid valve 74 is open. Line 76 connects line 73 to valve body 67, thus exposing the lower end 70 of small piston 71 to pressure P1. Line 77 connects to line 15A and exposes the upper end 69 of small piston 71 to pressure P2, which is lower than P1. Finally, line 79 communicates between the upper end 69 of valve body 67 and line 13, immediately downstream of low pressure pump 12, which is at pressure Po, and line 78 connects line 79 to solenoid valve 74.

The fuel control system as shown in FIG. 3 is in its first position during engine operation. Solenoid valve 74 is closed and pressure in fuel cavity "A" 57, Px, is equal to P1 by virtue of fuel flow through line 73. Accordingly, large piston member "B" 51 is fully stroked toward upper end 52, and spring 55 is fully compressed. Simultaneously, since Px is higher than P2, small piston 71 is fully stroked toward the upper end 69, thus preventing fuel flow from line 77 (pressure P2) to line 79 (pressure Po). Therefore, during engine operation, the other embodiment of the inventive rapid shutdown and ecology system remains inoperative.

Figure 4:
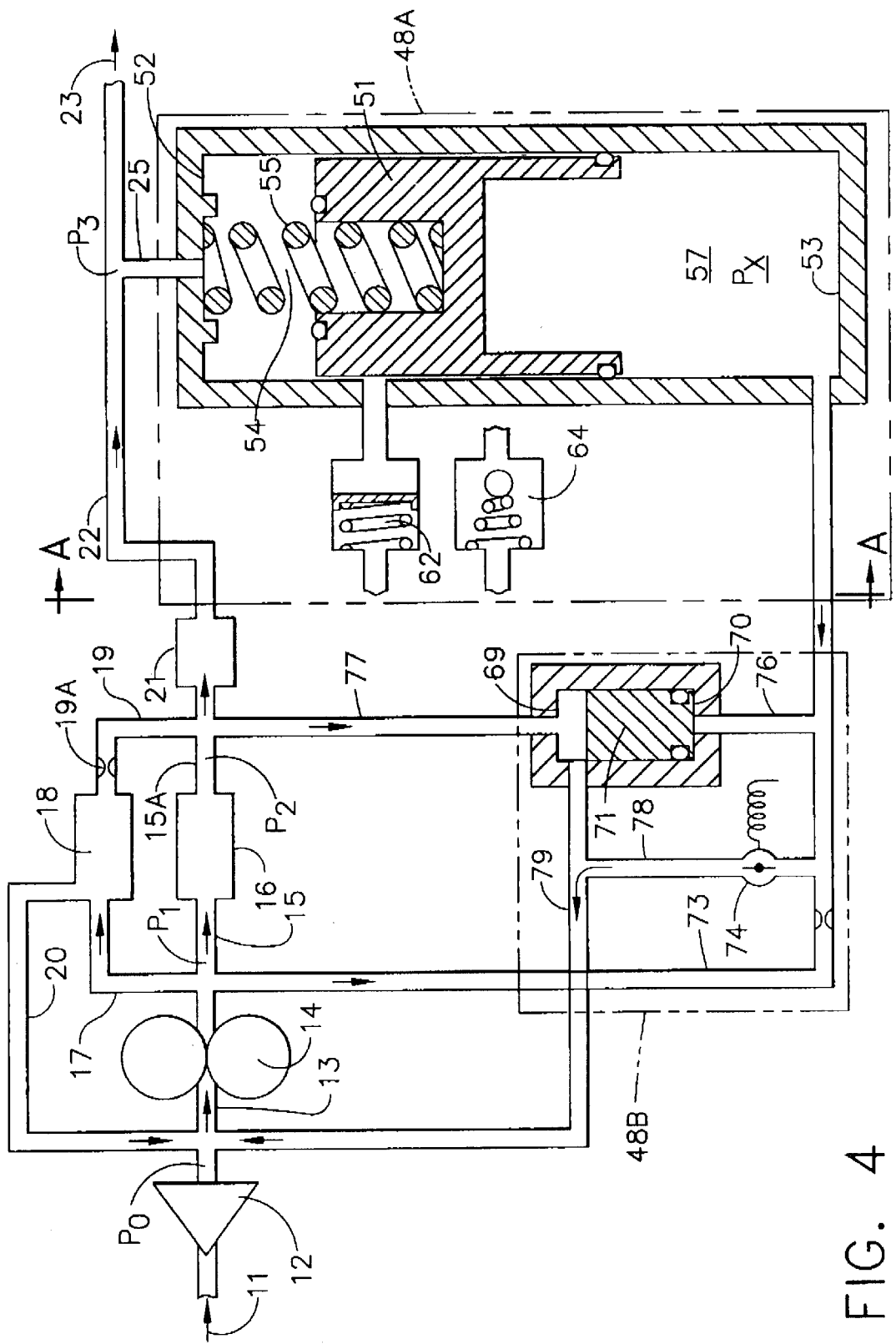
FIG. 4 is a similar schematic and partial cross sectional representation of a gas turbine engine fuel control system, including an alternate embodiment of the inventive rapid shutdown and ecology system, shown in its second position at engine shut down.

Referring now to FIG. 4, there is shown the same gas turbine engine fuel control system schematic as in FIG. 3 with the exception that the other embodiment of the inventive rapid shutdown and ecology system 10 is now shown in its second position at engine shut down. It is at this phase that it accomplishes its intended dual function of rapid shutoff (or turn on) of fuel flow as well as ecology fuel management.

When the gas turbine engine is shut down either by manual command from the control system (for instance, by the pilot for aircraft applications) or automatically through an overspeed, overtemperature or other fault detection system, the ECU opens solenoid valve 74 and shortly thereafter, when P2 falls below a predetermined level, pressure rising valve 21 closes. Closure of pressure rising valve 21 terminates fuel delivery to the combustor atomizers and opening of solenoid valve 74 immediately establishes a communication path between the upstream and downstream sides of high pressure pump 14 (via line 73, solenoid valve 74, and lines 78 and 79). Fuel pressure in fuel cavity "A" 57, Px, thus drops to Po, causing spring 55 to shift large piston member "B" 51 to the extreme of its stroke in the direction of lower end 53. This action increases the volume of fuel cavity "B" 54 thereby collecting all the fuel in the fuel control system 10 downstream of pressure rising valve 21, and preventing it from draining into the engine creating atmospheric pollution and/or puddling, causing hot starts upon subsequent engine operation.

Simultaneously, at rapid shutdown subsystem 48B, with the reduction of Px to Po, small piston 71 moves toward lower end 70, thus establishing an open communication path between line 77 and line 79. In addition, as the pressure in lines 77 and 19 fall to the P0 level the bypass valve 18 moves toward orifice 19A. These actions causes all of the fuel being delivered to the chamber atomizers to be immediately bypassed back to the high pressure pump 14 inlet, either through the bypass valve itself or through piston "A" cavity upper end 69. The rapid shutoff of fuel flow to the engine has therefore been achieved.

When solenoid valve 74 is again closed by ECU command, the reverse process takes place. Fuel cavity "A" 57 pressure Px increases to P1 forcing small piston 71 to move toward upper end 69, stopping flow through line 77 thus terminating the fuel bypass condition. On the ecology management subsystem, 48A, large piston member "B" 51 also moves toward upper end 52, compressing spring 55, and forcing the fuel previously collected in fuel cavity "B" 54 to return to the fuel control system manifold downstream of pressure rising valve 21. Rapid turn on of fuel flow to the engine has therefore been achieved and atmospheric pollution has been prevented.

The other embodiment also has the advantage that the ecology and rapid shutdown features can be separated, along line A—A of FIGS. 3 and 4, in the event the ecology function is not required, such as on military engines.

Although the present invention has been described in considerable detail with reference to certain preferred versions thereof, other versions are possible. Therefore, the spirit and scope of the appended claims should not be limited to the description of the preferred versions contained therein.

I claim:

1. A gas turbine engine fuel control rapid shut down and ecology system comprising:

a first cylindrically shaped valve body, internally bored to define a valve chamber having upper and lower ends;

a first cylindrical piston member placed internal to the valve chamber and movable therein along the longitudinal axis thereof;

a bored cavity at the upper end and along the longitudinal axis of the first cylindrical piston member;

a bored cavity at the lower end and along the longitudinal axis of the first cylindrical piston member, said bored cavity having a diameter larger than the bored cavity on the opposite end of the first cylindrical piston member;

a spirally wound spring positioned internal to the bored cavity at the upper end of the first cylindrical piston member, one end bearing on the base of the bored cavity and the other end bearing on the upper internal end of the valve chamber;

a fuel passageway leading from an annular cavity along the outer surface of the first cylindrical piston member to a spring loaded accumulator valve;

a fuel passageway leading from the spring loaded accumulator valve to a witness drain;

a second cylindrically shaped valve body, internally bored to define a second valve chamber having upper and lower ends;

a second cylindrical piston member placed internal to the second valve chamber and movable therein along the longitudinal axis thereof;

a fluid passageway connecting the upper end of the first valve chamber to a gas turbine engine fuel manifold immediately upstream of combustion chamber atomizers;

a fluid passageway connecting a gas turbine engine fuel manifold immediately downstream of a high pressure fuel pump to the lower ends of both first and second valve chambers;

a fluid passageway, including an electrically actuated solenoid valve, connecting the lower end of the first valve chamber and upper end of the second valve chamber to a gas turbine engine fuel manifold immediately downstream of a low pressure fuel pump;

a fluid passageway connecting the upper end of the second valve chamber to a gas turbine engine fuel manifold upstream of a valve controlling the fuel pressure delivered to combustion chamber atomizers;

whereby when said gas turbine engine is turned off, said solenoid valve will simultaneously open causing fuel pressure differentials to drive both first and second cylindrical piston members downward thus rapidly terminating further fuel flow to the combustion chamber atomizers, and providing a temporary cavity to accommodate all fuel leftover in the manifold and distribution system at shutdown as well as all fuel contained in the annular cavity along the outer surface of the first cylindrical piston member.

2. The gas turbine engine fuel control rapid shut down and ecology system of claim 1, wherein o-ring seals are provided on the first cylindrical piston member at the upper transverse surface and at the bottom peripheral surface.

3. The gas turbine engine fuel control rapid shut down and ecology system of claim 1, wherein an o-ring seal is provided on the lower peripheral surface of the second cylindrical piston.

4. The gas turbine engine fuel control rapid shut down and ecology system of claim 1, wherein the diameter of the first cylindrical piston member at the lower end is about 2.5 inches.

5. The gas turbine engine fuel control rapid shut down and ecology system of claim 4, wherein the diameter of the of the first cylindrical piston member at the location of the o-ring seals on the upper transverse surface is about 2 inches.

6. The gas turbine engine fuel control rapid shut down and ecology system of claim 1, wherein the stroke of the first cylindrical piston member within the valve chamber is about 1.5 inches.

7. The gas turbine engine fuel control rapid shut down and ecology system of claim 1, wherein an orifice is provided on the fluid passageway connecting a gas turbine engine fuel manifold immediately downstream of a high pressure fuel pump to the lower end of the valve chamber.

8. The gas turbine engine fuel control rapid shut down and ecology system of claim 1, wherein the depth and diameter of the bored cavity at the upper end and along the longitudinal axis of the first cylindrical piston member is sized to provide a scavenge volume sufficient to accommodate all fuel left over in the manifold and distribution system at shutdown.

9. The gas turbine engine fuel control rapid shut down and ecology system of claim 1, wherein a fuel passageway leading from an annular cavity along the outer surface of the first cylindrical piston member is connected to a spring loaded check valve and thereafter to a fluid passageway downstream of the low pressure pump, thereby allowing for remote location of the first cylindrical piston member and valve chamber.

10. A gas turbine engine fuel control rapid shut down and ecology system comprising:
- a first valve body internally bored to define a first valve chamber having upper and lower ends;
- a first piston member placed internal to the valve chamber and movable therein along a longitudinal axis thereof;
- an upper bored cavity at the upper end and along a longitudinal axis of the first piston member;
- a lower bored cavity at a lower end of and along the longitudinal axis of the first piston member, said lower bored cavity having a diameter larger than the upper bored cavity on the upper end of the first piston member;
- a spring positioned internal to the upper bored cavity, one end bearing on a base of the upper bored cavity and the other end bearing on an upper internal end of the valve chamber;
- a second valve body internally bored to define a second valve chamber having upper and lower ends;
- a second piston member placed internal to the second valve chamber and movable therein along a longitudinal axis thereof;
- a first fluid passageway connecting the upper end of the first valve chamber to a gas turbine engine fuel manifold immediately upstream of combustion chamber atomizers;
- a second fluid passageway connecting a gas turbine engine fuel manifold immediately downstream of a high pressure fuel pump to the lower ends of both first and second valve chambers;
- a third fluid passageway, including a passageway valve, connecting the lower ends of the first and second valve chambers and the upper end of the second valve chamber to the gas turbine engine fuel manifold immediately downstream of a low pressure fuel pump;
- a fourth fluid passageway connecting the upper end of the second valve chamber to the gas turbine engine fuel manifold upstream of a fuel pressure controlling valve controlling a fuel pressure delivered to combustion chamber atomizers;
- wherein, when the gas turbine engine is turned off, said passageway valve will open causing fuel pressure differentials to drive both first and second piston members from an operating position to a shut-down position, thus terminating further fuel flow to the combustion chamber atomizers, and providing a temporary cavity to accommodate the fuel leftover in the gas turbine engine manifold and distribution system at shutdown.

11. The gas turbine engine fuel control rapid shut down and ecology system of claim 10, wherein the passageway valve is an electrically actuated solenoid valve, the electrically actuated solenoid valve being actuated by a manual command or automatically through one of an overspeed, overtemperature or other fault detection system.

12. The gas turbine engine fuel control rapid shut down and ecology system of claim 10, wherein:
- the first valve body and the second valve body are cylindrically shaped; and
- the first piston member and the second piston member are cylindrically shaped.

13. The gas turbine engine fuel control rapid shut down and ecology system of claim 10, wherein the spring is a spirally wound spring providing a resilient force on the upper end of the first valve body.

14. The gas turbine engine fuel control rapid shut down and ecology system of claim 10 further comprising:
- a fifth fuel passageway leading from an annular cavity along an outer surface of the first cylindrical piston member to a spring loaded accumulator valve; and
- a sixth fuel passageway leading from the spring loaded accumulator valve to a witness drain.

15. The gas turbine engine fuel control rapid shut down and ecology system of claim 10, further comprising:
- a fifth fuel passageway leading from an annular cavity along an outer surface of the first piston member to a spring loaded check valve; and
- a sixth fuel passageway leading from said spring loaded check valve to a gas turbine engine fuel manifold immediately downstream of a low pressure fuel pump.

16. A gas turbine engine, having a gas turbine engine fuel manifold with a fuel shut down system and an ecology system, comprising:
- a first valve body internally bored to define a valve chamber having upper and lower ends;
- a first piston member placed internal to the valve chamber and movable therein along a longitudinal axis thereof;
- an upper bored cavity at an upper end of and along a longitudinal axis of the first piston member;
- a lower bored cavity at a lower end of and along the longitudinal axis of the first piston member, said lower bored cavity having a diameter larger than the upper bored cavity on an opposite end of the first piston member;
- a spring positioned internal to the upper bored cavity, one end bearing on a base of the upper bored cavity and the other end bearing on an upper internal end of the valve chamber;
- a second valve body internally bored to define a second valve chamber having upper and lower ends;
- a second piston member placed internal to the second valve chamber and movable therein along a longitudinal axis thereof;
- a first fluid passageway connecting the upper end of the first valve chamber to a gas turbine engine fuel manifold immediately upstream of combustion chamber atomizers;
- a second fluid passageway connecting the gas turbine engine fuel manifold immediately downstream of a high pressure fuel pump to the lower ends of both first and second valve chambers;

a third fluid passageway, including a passageway valve, connecting the lower end of the first and second valve chambers and the upper end of the second valve chamber to the gas turbine engine fuel manifold immediately downstream of a low pressure fuel pump;

a fourth fluid passageway connecting the upper end of the second valve chamber to the gas turbine engine fuel manifold upstream of a pressure rising valve controlling the fuel pressure delivered to combustion chamber atomizers;

wherein, when the gas turbine engine is turned off, said passageway valve will simultaneously open causing fuel pressure differentials to drive both first and second cylindrical piston members from an operating position to a shut down position, thus terminating further fuel flow to the combustion chamber atomizers, and providing a temporary cavity to accommodate the fuel leftover in the gas turbine engine fuel manifold system at shutdown.

17. The gas turbine engine of claim 16, further comprising:

a fifth fuel passageway leading from an annular cavity along an outer surface of the first cylindrical piston member to a spring loaded accumulator valve; and a sixth fuel passageway leading from the spring loaded accumulator valve to a witness drain.

18. The gas turbine engine of claim 16, further comprising:

a fifth fuel passageway leading from an annular cavity along an outer surface of the first cylindrical piston member to a spring loaded check valve; and a sixth fuel passageway leading from said spring loaded check valve to the gas turbine engine fuel manifold immediately downstream of a low pressure fuel pump.

19. A method for providing a gas turbine engine having a fuel control rapid shut down and ecology system comprising:

providing a first cylindrically shaped valve body internally bored to define a valve chamber having upper and lower ends;

placing a first cylindrical piston member internal to the valve chamber and movable therein along a longitudinal axis thereof;

boring an upper cavity at an upper end of and along a longitudinal axis of the first cylindrical piston member;

boring a lower cavity at a lower end of and along the longitudinal axis of the first cylindrical piston member, said lower cavity having a diameter larger than the upper cavity;

positioning a spirally wound spring internal to the upper cavity, one end bearing on a base of the upper cavity and another end bearing on an upper internal end of the valve chamber;

providing a first fuel passageway leading from an annular cavity along an outer surface of the first cylindrical piston member to a spring loaded accumulator valve;

providing a second fuel passageway leading from the spring loaded accumulator valve to a witness drain;

providing a second cylindrically shaped valve body internally bored to define a second valve chamber having upper and lower ends;

placing a second cylindrical piston member internal to the second valve chamber and movable therein along a longitudinal axis thereof;

providing a third fluid passageway connecting the upper end of the first valve chamber to a gas turbine engine fuel manifold immediately upstream of combustion chamber atomizers;

providing a fourth fluid passageway connecting a gas turbine engine fuel manifold immediately downstream of a high pressure fuel pump to the lower ends of both first and second valve chambers;

providing a fifth fluid passageway, including an electrically actuated solenoid valve, connecting the lower end of the first valve chamber and upper end of the second valve chamber to the gas turbine engine fuel manifold immediately downstream of a low pressure fuel pump;

providing a sixth fluid passageway connecting the upper end of the second valve chamber to the gas turbine engine fuel manifold upstream of a valve controlling the fuel pressure delivered to combustion chamber atomizers;

wherein when the gas turbine engine is turned off, said solenoid valve will simultaneously open causing fuel pressure differentials to drive both first and second cylindrical piston members from an operating position to a shut-down position, thus terminating further fuel flow to the combustion chamber atomizers, and providing a temporary cavity to accommodate the fuel leftover in the gas turbine engine fuel manifold at shutdown as well as all fuel contained in the annular cavity along the outer surface of the first cylindrical piston member.

* * * * *